(12) United States Patent
Naruo et al.

(10) Patent No.: US 6,560,097 B2
(45) Date of Patent: May 6, 2003

(54) ELECTRONIC APPARATUS

(75) Inventors: Teruhiro Naruo, Higashine (JP);
Shin-ichi Satoh, Higashine (JP);
Kazuya Takahashi, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/740,150

(22) Filed: Dec. 18, 2000

(65) Prior Publication Data
US 2001/0026437 A1 Oct. 4, 2001

(30) Foreign Application Priority Data
Apr. 3, 2000 (JP) ...................................... 2000-100608

(51) Int. Cl.[7] ................................................ G06F 1/16
(52) U.S. Cl. ...................... 361/685; 361/683; 361/686; 369/75.1
(58) Field of Search .................... 361/679, 683–686, 361/746, 750, 212; 369/75.1, 75.2, 77.1, 77.2

(56) References Cited

FOREIGN PATENT DOCUMENTS

| JP | 5-198069 | 8/1993 |
| JP | 9-069284 | 3/1997 |
| JP | 11-003583 | 1/1999 |
| JP | 11-126409 | 5/1999 |

*Primary Examiner*—Darren Schuberg
*Assistant Examiner*—Yean-Hsi Chang
(74) *Attorney, Agent, or Firm*—Greer, Burns & Crain, Ltd.

(57) ABSTRACT

It is an exemplified object of the present invention to provide an electronic apparatus that easily and inexpensively prevents electronic components from being destroyed by electrostatic discharge, and has high durability and reliability. The inventive electronic apparatus is an electronic apparatus which a storage medium is inserted into and ejected from through an opening, and includes a conductive member disposed around the storage medium that is inserted, and an insulating member provided at least near the opening on a surface of the conductive member facing the storage medium.

20 Claims, 14 Drawing Sheets

ELECTRONIC APPARATUS

BACKGROUND OF THE INVENTION

The present invention relates generally to electronic apparatuses, and more particularly to an electrostatic discharge prevention mechanism applicable to an electronic apparatus. The electronic apparatuses to which the present invention is applicable may include information storage devices, personal computers (PCs), personal digital assistants (PDAs), digital cameras, various types of card readers, expansion bays, and the like.

A storage medium and a storage device are a typical combination of the electronic apparatuses in which one element is not made available for use until mounted in the other element; to be specific, a storage medium (e.g., floppy disk, and optical disk) is mounted in a storage device (e.g., floppy disk drive or FDD, and optical disk drive), and put in commission.

The storage device generally includes a built-in drive (or drive body), and an insulating external housing that can accommodate the drive body. The drive body is secured in the external housing directly or via mounting members, and connected with a host processor (e.g., desktop PC) through the housing. The storage device using a USB or IEEE1394 interface further includes a printed circuit board for connecting with a cable to interface the drive body with the host processor. The external housing is comprised of a PC body housing when the storage device is built in the desktop PC, and of an external case when the storage device is an external device. The drive body and the external housing, each having an inlet for receiving a storage medium, generally assume the shape of a rectangular parallelepiped having an opening at a side of the drive body from which the storage medium is inserted.

Characteristically, a user mounts a storage medium in the storage device by inserting the storage medium from the inlet on a front panel of the storage device and pushing a rear end portion of the storage medium in with a forefinger, or the like. The drive body includes a drive system that drives the mounted storage medium to rotate.

The front panel is an insulating member having an inlet, which is always open or includes an openable/closable door. The front panel is provided either on the drive body or on the external housing. For instance, the front panel of the storage device built in the desktop PC is mounted on the drive body. In this instance, the front panel attached onto the drive body is fitted in an opening of the external housing, when the drive body is mounted in the PC body (external housing). On the other hand, as for the external storage device, generally the external case includes the front panel. The front panel may be integrally configured with the external case. In this instance, the drive body stays open in the external housing.

However, no sufficient measures are adopted to prevent electrostatic discharge for a drive body in a conventional storage device. As described above, the external housing and the front panel are made of insulating materials such as plastic, or the like, but the drive body and the mounting members are generally made of metal. Therefore, when the inlet on the front panel is opened, a metal portion in the drive body is exposed in principle; thus, sparking, which may occur through a user's fingertip, metal portion of the storage medium, or the like having static electricity, would disadvantageously fly to circuit components in the housing, whereby the components are prone to malfunction. Moreover, the storage device using a USB or other interfaces would disadvantageously suffer destruction of the printed circuit board for the interface through the electrostatic discharge.

As a remedy for the above disadvantages, several means such as a frame grounding method and a signal grounding method have been proposed to prevent damage due to electrostatic discharge. The frame grounding method includes a means for preventing transmission of a noise derived from electrostatic discharge between the devices, or inside or outside the devices, such as a shield of an interface cable for connection between devices, or the like. On the other hand, the signal grounding method is a means for supplying a reference potential to an electric signal system, such as a direct current power supply at 0V, a ground layer in the printed circuit board, a ground pattern, or the like. However, these means are for the purpose of minimizing the problems caused by the electrostatic discharge, and are not intended to directly solve the above disadvantages. Particularly, the signal grounding method varies in great complexity with the interface structures (i.e., the presence or absence of the printed circuit board, or a structure thereof), and thus the conventional signal grounding method could not effectively protect various interfaces from the electrostatic discharge.

In order to effectively protect the drive body and the like from damages due to the electrostatic discharge, a static preventive means before the electrostatic discharge occurs is preferable to a static protective or dissipative means after the electrostatic discharge has occurred. On the other hand, however, the drive system for the drive body needs to be made of metal member having superiority in strength, working accuracy, and thermal conductivity, and similarly the printed circuit board also needs metal wiring. Consequently, it turned out that metal members likely to produce electrostatic discharge could not completely be eliminated from the drive body and the like.

BRIEF SUMMARY OF THE INVENTION

Therefore, it is an exemplified object of the present invention to provide a novel and useful electronic apparatus that can easily and inexpensively prevent destruction of electronic components due to electrostatic discharge, to ensure high durability and reliability.

In order to achieve the above objects, an exemplified embodiment of the inventive electronic apparatus is an electronic apparatus including an opening through which a storage medium is inserted into and ejected from the apparatus, and includes a conductive member disposed around the storage medium that is inserted, and an insulating member provided at least near the opening on a surface of the conductive member facing the storage medium. This electronic apparatus is provided with the insulating member, which was previously not provided, and thus more impervious to electronic discharge. The opening is a concept that may be embodied in an inlet.

Another embodiment of the inventive electronic apparatus comprises a storage part that stores and holds a drive body including an opening through which a storage medium is inserted into and ejected from the drive body, and an insulating member provided at least on an end portion of the storage part near the opening. This electronic apparatus has the insulating member, which was previously not provided, coupled with the storage part, and is thus more impervious to electronic discharge.

An exemplified embodiment of the inventive mounting member comprises a support part that supports a drive body including an opening through which a storage medium is inserted into and ejected from the drive body, so as to mount the drive body in a housing capable of accommodating the drive body, and an insulating member provided at least on a portion of the support part near the opening. This mounting member is also impervious to electronic discharge as the above electronic apparatus.

Other objects and further features of the present invention will become readily apparent from the following description of the embodiments with reference to accompanying drawings.

DETAILED DESCRIPTION OF INVENTION

Figure 1:
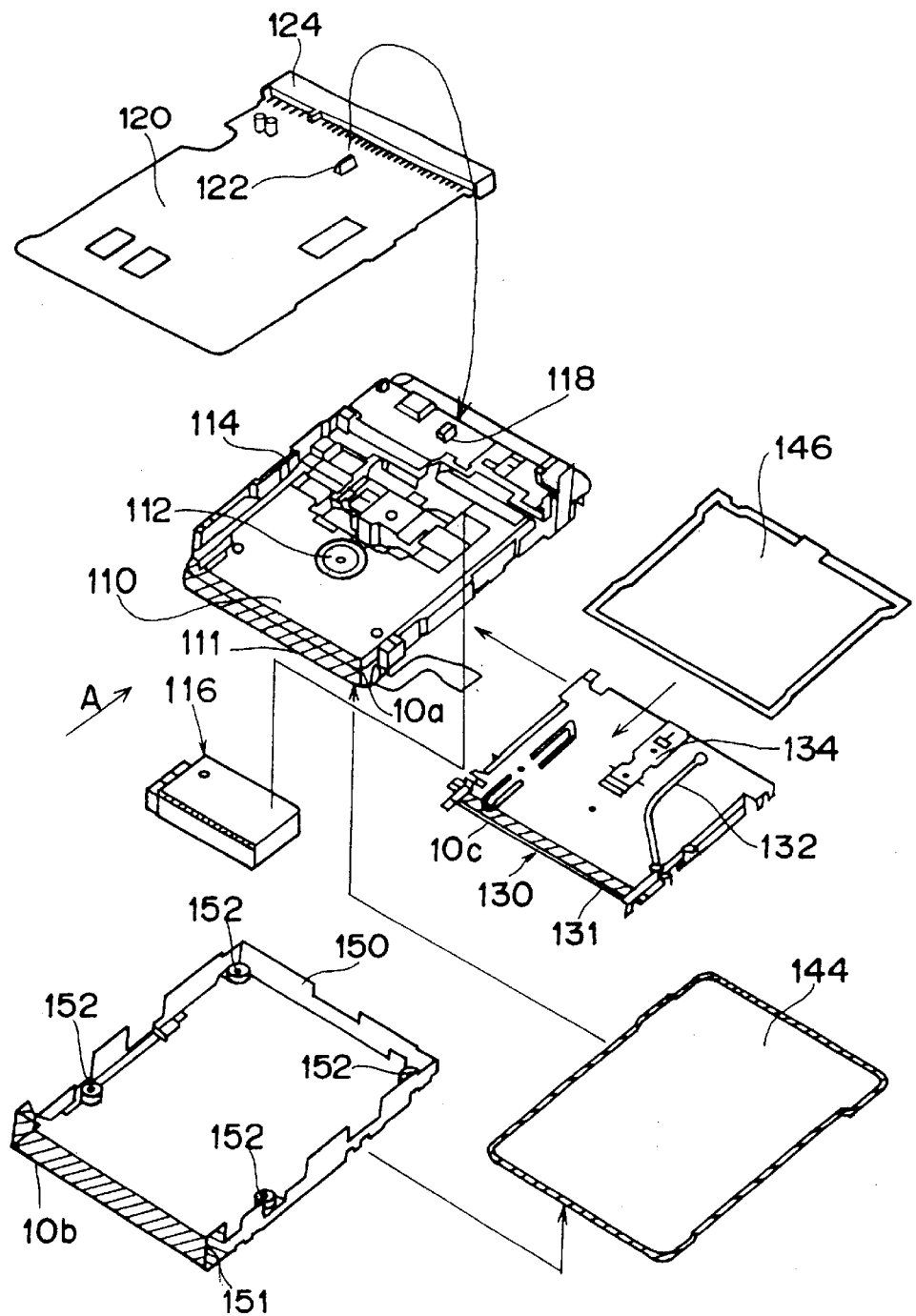
FIG. 1 is an exploded perspective view for showing a structure of a drive body as one exemplified embodiment of the present invention.
Figure 2:
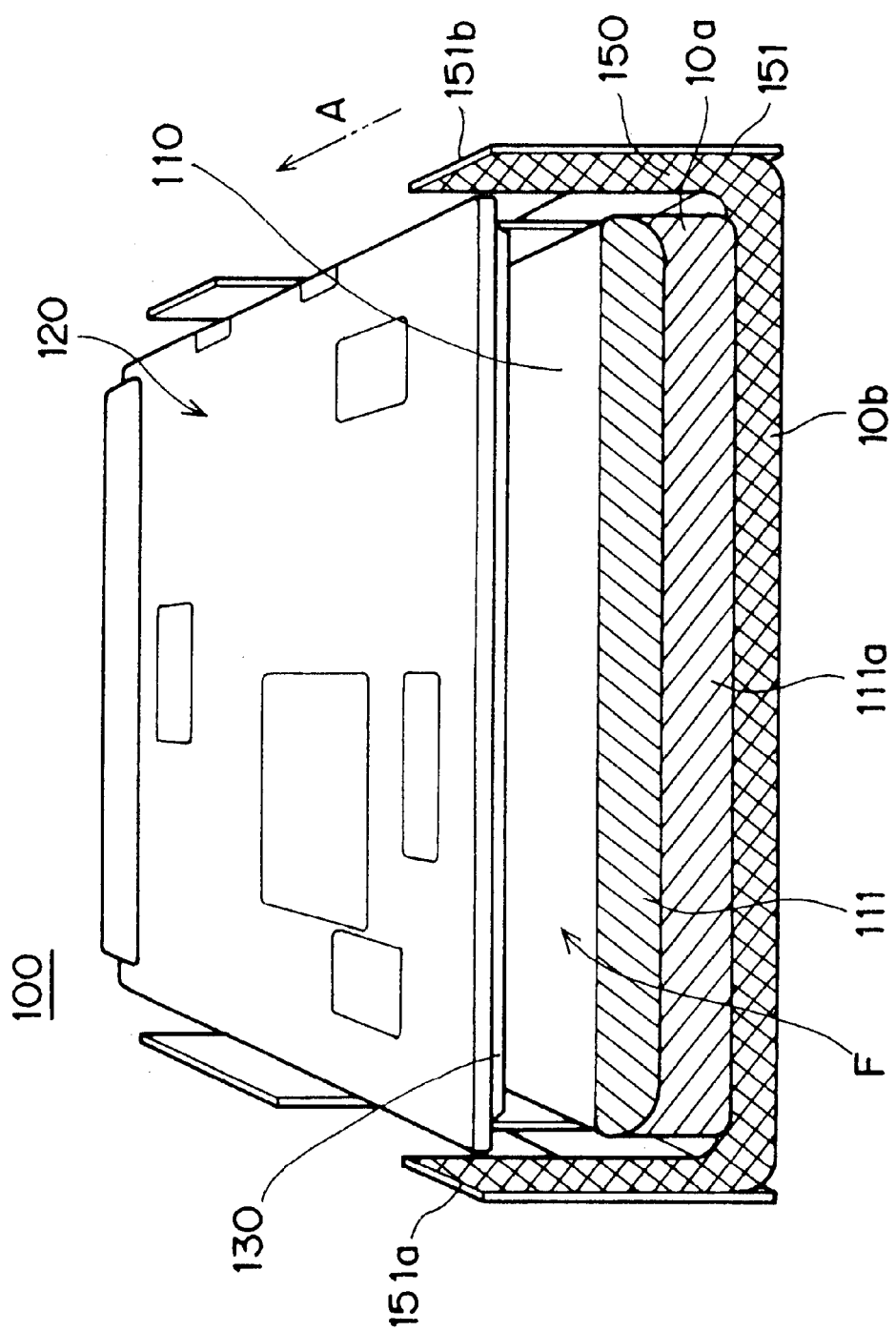
FIG. 2 is a perspective view of the drive body shown in FIG. 1 that has been assembled as viewed from a front side thereof.
Figure 3:
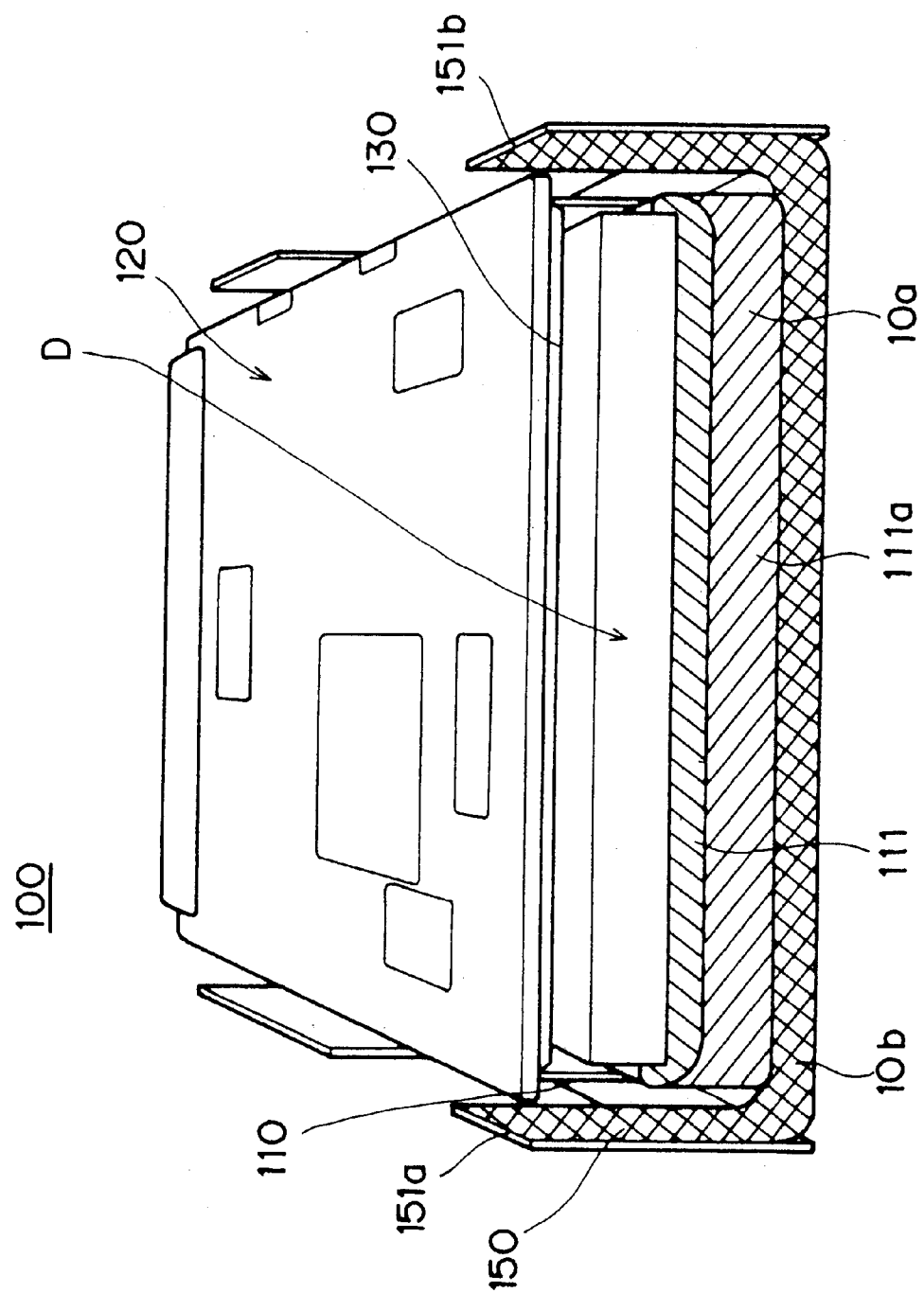
FIG. 3 is a perspective view of the drive body in FIG. 2 for showing a state in which a disk cartridge is inserted.
Figure 4:
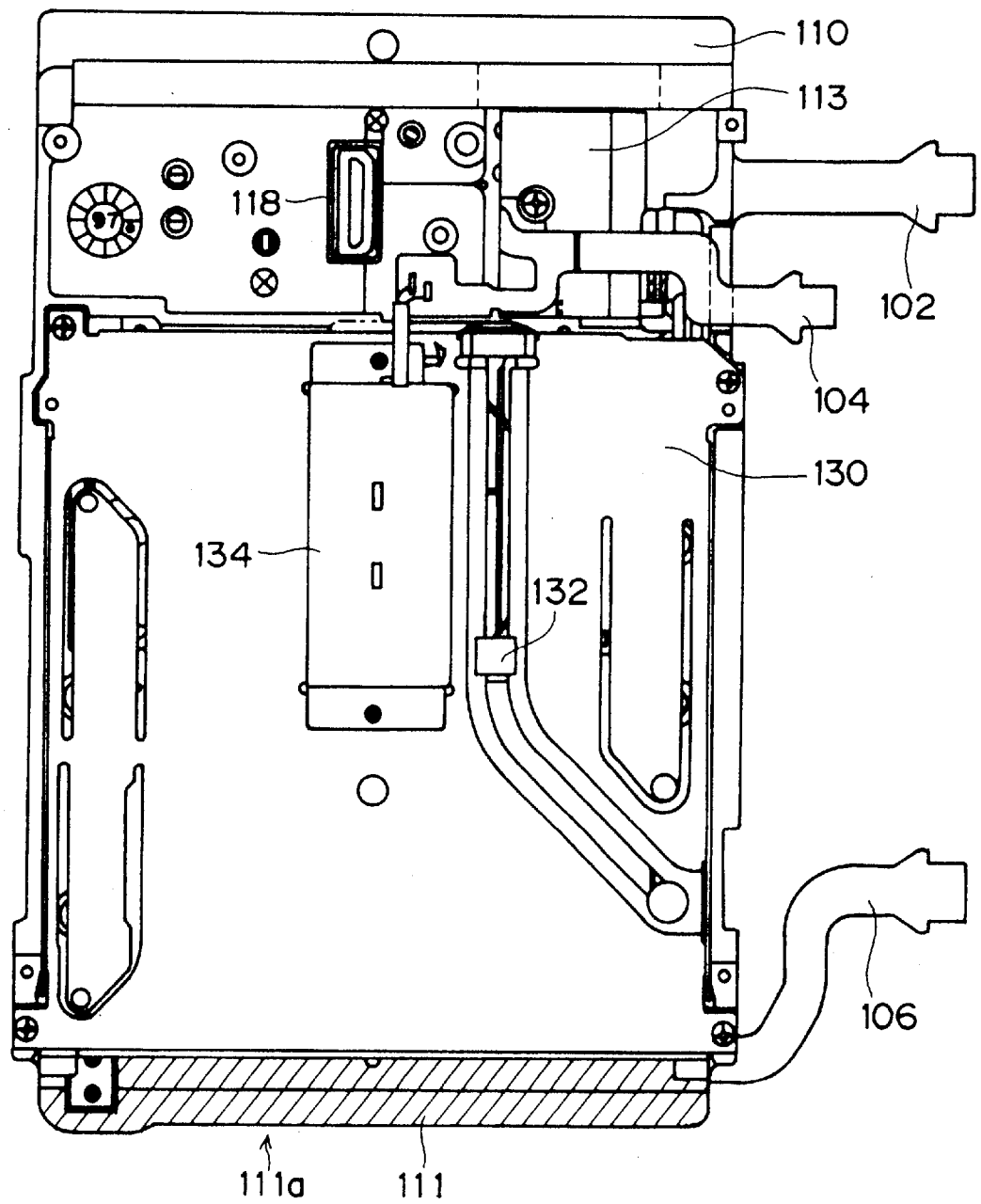
FIG. 4 is a plan view for showing a state in which the drive body in FIG. 1 has been partially assembled.
Figure 5:
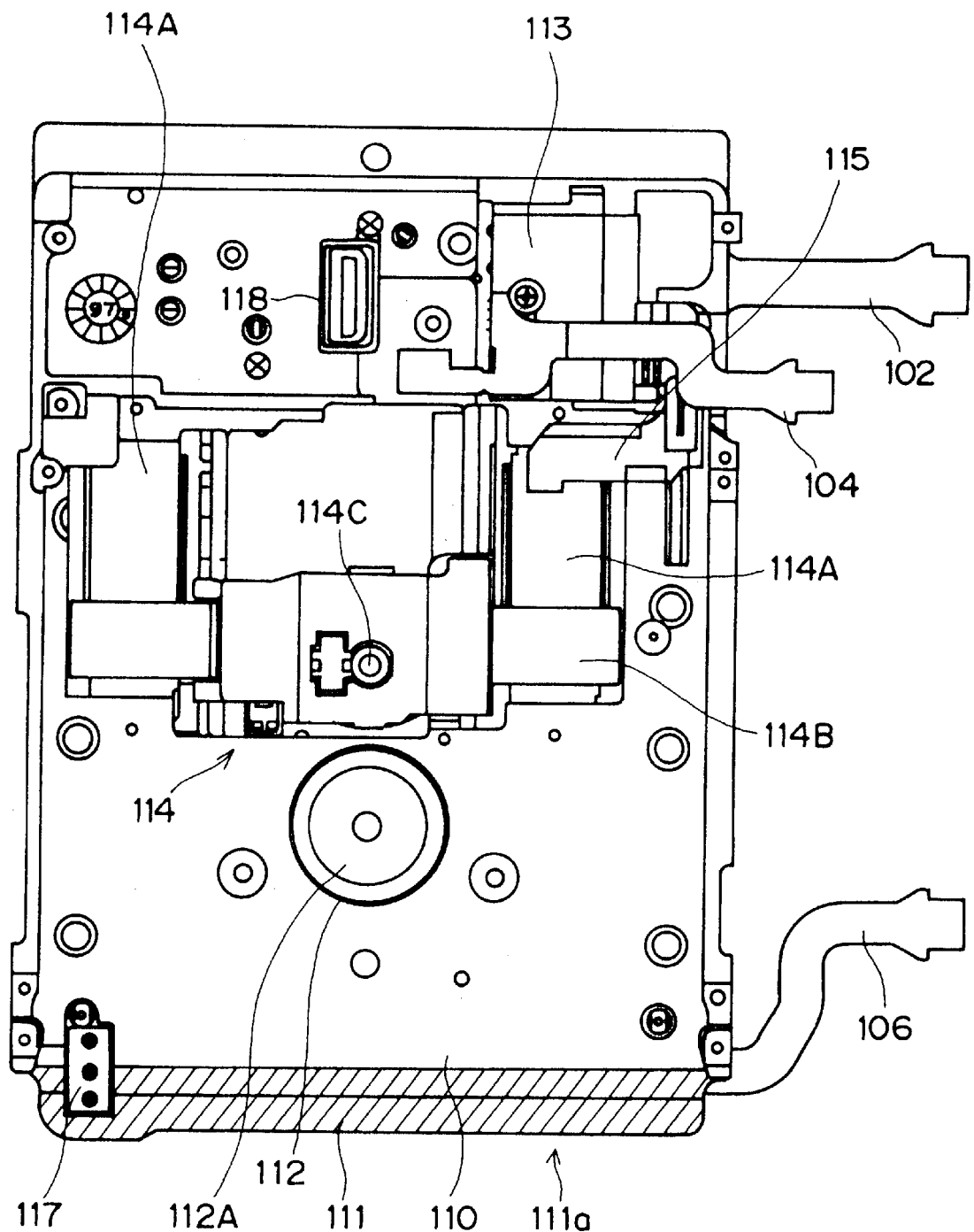
FIG. 5 is a plan view for showing a state in which an optical disk cartridge loading assembly is removed from the drive body in FIG. 4.

A detailed description will now be given of an exemplified embodiment of the drive body 100 according to the present invention, with reference to FIGS. 1 to 5 inclusive. FIG. 1 is an exploded perspective view for showing a structure of the drive body 100. FIG. 2 is a perspective view of the drive body 100 that has been assembled as viewed from a front side thereof. FIG. 3 is a perspective view of the drive body 100 in FIG. 2 for showing a state in which a disk cartridge D is inserted. FIG. 4 is a plan view for showing a state in which essential parts of the drive body 100 shown in FIG. 1 have been assembled. FIG. 5 is a plan view for showing a state in which an optical disk cartridge loading assembly 130 is removed from the drive body 100 shown in FIG. 4. In FIGS. 4 and 5, an illustration of frame 150, which will be described later, is omitted. In each drawing, those elements designated by the same reference numerals denote the same elements, and a duplicate description thereof will be omitted.

The drive body 100 in FIGS. 1 through 5 is exemplarily shown as a drive body of an optical disk drive in which a magneto-optical (MO) disk is used as a removable disk, and may be used for either the built-in type drive or the external drive. The drive body 100, if used for the built-in type drive, may be stored, for example, in a housing 440 of a desktop PC 400, which will be described later with reference to FIG. 10, and if used for the external drive, may be stored, for example, in a cases 340 and 350 of the storage device 300, which will be described later with reference to FIG. 9.

The drive body 100 includes a drive part that drives a removable medium and a processor part (electronic circuitry part) that executes a specific process with (e.g., records on and/or reads from) the medium, but does not necessarily include a power supply unit and a circuit board for an interface. In addition, the drive body 100 includes a support part that supports the medium, but any shape and structure may be applied to the support part. For instance, as far as a portion capable of supporting the medium continuously or temporarily is included, the support part may assume the shape of a pedestal, a box, or part of these forms, and may be configured to be movable (e.g., up and down) or unmovable.

The inventive drive body 100, like a drive 200, which will be described later with reference to FIGS. 6 through 8, may be used with the disk cartridge D, and record and/or read various data on a magneto-optical disk in the disk cartridge D, but unlike the drive body 200 includes a movable spindle motor 112.

Referring to FIG. 1, the drive body 100 includes an insulating member 10, a drive base 110, a fixed optical assembly 116, a printed wiring board 120, an optical disk cartridge loading assembly (hereinafter simply referred to as disk loading assembly) 130, a bottom cover 144, a insulating sheet 146, a frame 150. As shown in FIG. 2, the drive base 110, disk loading assembly 130, and frame 150 form an inlet F for inserting and withdrawing the disk cartridge D.

The drive base 110 is, for instance, made of aluminum or aluminum alloy that generally have high electrical conductivity, formed using an aluminum die-casting die, and provided with a spindle motor 112 that drives to rotate a disk in the disk cartridge D, a moving optical assembly 114 and fixed optical assembly 116 that records and/or reads data on the disk, and a connector 118 for establishing connection with a printed wiring board 120, and the like. As described in FIGS. 4 and 5, on the disk base 110 is provided an eject motor 113, and an eject lever 115 that is driven by the eject motor 113. The eject motor 113 serves to eject the disk cartridge D stored in the disk loading assembly 130, which will be described later. The eject lever 115 is provided in a portion of the drive base 110 hidden behind the disk loading assembly 130 in FIG. 4. In addition, referring to FIG. 5, at one end of an inlet side of the disk cartridge D on the drive base 110 is provided a cartridge identification switch 117 for detecting a type of the disk cartridge D. The drive base 110 also serves as a support part that supports the disk cartridge D, and is coated with the insulating member 10.

The spindle motor 112, as shown in FIG. 5, includes a turntable 112A engageable with a disk hub at a top portion thereof, and is mounted on an ascent/descent plate (not shown). The ascent/descent plate may ascend and descend with an ascent/descent mechanism (not shown), so that the spindle motor 112 may move up and down. The spindle motor 112 is hidden under a top surface of the drive base 110, when no disk cartridge D is inserted. When the disk cartridge D is inserted, the spindle motor 112 is projected from the top surface of the drive base 110, and becomes engaged with the hub in the disk cartridge D. Consequently, the turntable 112A is engaged with the hub in the disk cartridge D, and rotates the disk. In the drive body 200, which will be described later, however, the spindle motor 268 does not move up and down.

The moving optical assembly 114 moves horizontally on the top surface of the disk in the disk cartridge D to record and/or read data in the disk cartridge D. As shown in FIG. 5, the moving optical assembly 114 includes a carriage 114B that moves along a magnetic circuit 114A, and the carriage 114B is provided with an objective lens 114C that irradiates the disk cartridge D with a laser light. At a bottom side of the drive base 110 is provided the fixed optical assembly 116, which is sealed with the bottom cover 144. The moving optical assembly and the fixed optical assembly 116 make up a separated optical system, and allow the moving optical assembly 114 to move in a short time.

The printed wiring board 120 is mounted with a drive circuit of the drive body 100 at a front side thereof (not shown), and with a connector 122 to be connected with the connector 118 provided in the drive base 110 at a back side thereof. The printed circuit board 120 is turned upside down from the state as shown in FIG. 1 and mounted on the top of the drive base 110. A connector provided at an end portion of the printed wiring board is used for establishing connection with an external apparatus (e.g., a PC).

The disk loading assembly 130, which is also called a cartridge holder, includes an open/close arm 132 that opens and closes a shutter of the disk cartridge D, and a bias magnetic assembly 134 that generates a magnetic field for recording and reading. The disk loading assembly 130 is made of metal such as metal or steel plate, stainless steel plate, or the like, and is mounted between the printed wiring board 120 and the drive base 110, with the insulating sheets 146 interleaved between each other. The insulating sheet 146 prevents a radio wave derived from the drive base 110 and the disk loading assembly 130 from propagating to a variety of circuitry in the printed wiring board 120. The disk loading assembly 130 is coated with the insulating member 10.

The frame 150 is formed with a stainless plate. The frame 150 includes a rubber isolator 152 for placing the drive base 110 thereon. On the rubber isolator 152, the drive base 110 is placed and fastened by screws or the like (not shown). As shown in FIGS. 2 and 3, inner sides of the frame 150 form both of right and left sides of the inlet F. The both sides are coated with the insulating member 10 that will be described later.

Referring again to FIGS. 4 and 5, the drive body 100 includes flexible printed circuits (hereinafter referred to as "FPC") 102, 104, and 106. The FPC 102 communicates with a carriage (not shown), the FPC 104 communicates with the eject motor 113 and the bias magnetic assembly 134, and the FPC 106 communicates with the spindle motor 112.

The insulating member 10, as described above, includes an insulating member 110a coating the drive base 110, an insulating member 10b coating the frame 150, and an insulating member 10c coating the disk loading assembly 130. The insulating member 10 prevents electrostatic discharge from occurring in the drive body 100, and protects electronic components in the drive body from being destroyed when a disk cartridge D is inserted into the drive body 100, or when a finger or the like comes in the drive body 100. Accordingly, the drive body 100 in the present embodiment is more impervious to the electronic discharge than a conventional drive body that has no means for preventing or reducing the incidence of the electrostatic discharge in the drive body.

The drive body 100 is made of a lot of metal parts because the metal has the properties of dimensional accuracy, strength, exothermicity, or the like, and the metal parts, if entirely coated with the insulating member, could be protected from the electrostatic discharge. However, this would result in increased manufacturing costs and lowered dimensional accuracy. For instance, various elements 110 through 150 in the drive body 100 are positioned with reference to the drive base 110, and if entirely coated with the insulating member 10, would lower the positioning accuracy. Therefore, in the present embodiment, the insulating member 10 is formed only at the side of each element 110 through 150 from which a disk cartridge D is inserted, i.e., respective end portions of the drive base 110, disk loading assembly 130, and frame 150.

The end portion of the drive base 110 is positioned at the side of the drive base 110 from which the disk cartridge D is inserted as shown by hatching in FIGS. 1 through 5 and covers an area which extends 1 cm or less in depth along a direction in which the disk cartridge D is inserted from the end surface 111a of the drive base 110 (direction A). The width of the area (length in a direction perpendicular to the direction A) may be such a length as covers the entire width of the drive base 110 as in the present embodiment, or may have at least a length enough to cover that middle portion of the drive base 110 which a user's finger is allowed to touch (or access). The "1 cm or less" is an exemplary value that means a length enough to prevent the electrostatic discharge, and is not intended to be restrictive. The length that is likely to produce electrostatic discharge depends upon a dimension of the inlet 344 of the front panel 342 that will be described later, and the like, and may thus be experimentally determined for each type of the drive body 100. The length may also be determined with reference to a length that a user's finger at large may reach in the inlet F. The determinations of the length as above would advantageously allow the insulating member 10a not only to reduce the likelihood of electrostatic discharge occurring in the drive body 100, but also to entirely prevent electrostatic discharge. Accordingly, the end portion of the drive base 110 may be only the end surface 11a, and the "1 cm or less" in this case turns out to be 0 cm.

Alternatively, the end portion of the drive base 110 may be defined as a projection portion 111 of the printed wiring board 120 and disk loading assembly 130. The projection portion 111 is a hatched area in FIGS. 4 and 5, and forms a taper surface so as to introduce the disk cartridge D inside. The insulating member 10a coats the end portion (projection portion 111) of the drive base 110 except a portion in which a cartridge identification switch 117 is formed. Optionally, the insulating member 10a also coats the cartridge identification switch 117. As will be described later, a movable panel 346 of the front panel 342 may be given at least a 90-degree turn, so as to secure an opening of the inlet 344 of the front panel 342, while the printed wiring board 120 and the disk loading assembly 130 are disposed in a recessed position, so as to ensure that the movable panel 346 pivots.

The insulating member 10a in the present embodiment has a bent structure along the shape of the projection portion 111 because the insulating member 10a is continuously provided from the drive base 110 to the end portion 11a as shown in FIGS. 2 and 3. For the insulating member 10a, for example, an insulating tape comprised of an adhesive and a peel-off sticker may be used. Among materials commercially available for the insulating tape is, for example, No. 3161F-#25 manufactured by Nitto Denko Corporation.

The end portion of the disk loading assembly 130 is positioned at the side of the disk loading assembly 130 from which the disk cartridge D is inserted, as shown by hatching in FIGS. 1 through 3, and covers an area which extends 1 cm or less in depth along a direction in which the disk cartridge D is inserted from the end surface 131 of the disk loading assembly 130 (direction A). The width of the area (length in a direction perpendicular to the direction A) may be such a length as covers the entire width of the disk loading assembly 130 as in the present embodiment, or may have at least a length enough to cover that middle portion of the disk loading assembly 130 which a user's finger is allowed to touch (or access). The "1 cm or less" is, as described above, an exemplary value that means a length enough to prevent the electrostatic discharge, and is not intended to be restrictive. The end portion of the disk loading assembly 130 to be coated with insulation preferably includes a surface at the side of the inlet F at which electrostatic discharge is likely to occur, and depending upon the structure, a coating with insulation on a surface opposite to that surface may be omitted.

Since the pivoted insulating movable panel 346 partially covers the end portion of the disk loading assembly 130 in actuality, depending particularly upon the size, or the like of the inlet 344 of the front panel 342, the insulating member 10c may not be needed. For the insulating member 10c, if needed, an insulating tape may be used as for the insulating member 10a.

The end portion of the frame 150 is positioned at the side of the frame 150 from which the disk cartridge D is inserted, as shown by hatching in FIGS. 1 through 3, and covers an area which extends 1 cm or less in depth along a direction in which the disk cartridge D is inserted from the end surface 151 of the frame 150 (direction A). The width of the area (length in a direction perpendicular to the direction A) may be such a length as covers the entire width of the continuous end surfaces 151a to 151b of the frame as in the present embodiment (as shown in FIGS. 2 and 3), or may have at least a length enough to cover that portion of the frame 150 which a user's finger is allowed to touch (or access). The "1 cm or less" is, as described above, an exemplary value that means a length enough to prevent the electrostatic discharge, and is not intended to be restrictive. The end portion of the frame 150 to be coated with insulation preferably, as shown in FIG. 2, includes a surface at the side of the inlet F at which electrostatic discharge is likely to occur, and depending upon the structure, a coating with insulation on a surface opposite to that surface may be omitted.

For the insulating member 10b in the present embodiment, for instance, an insulating sheet having a double-faced tape may be used. If the insulating member 10b can be brought into intimate contact with a bottom surface (opposite to the inlet F) of the drive base 110 as shown in FIG. 2 provision of the insulating member 10a on the bottom surface of the drive base 110 may be omitted. The insulating member 10b as shown in FIGS. 1 through 3 is continuously provided from the end surfaces 151a to 151b of the frame along the frame 150 so as to come in intimate contact with the bottom surface of the drive base 110, and thus has a structure in which the both sides are bent.

The insulating member 10 in the present embodiment, although may be made of any material and assume any shape, does not include such materials as an insulating panel that occupies a space other than the inlet F to avoid increased complexity and cost in a manufacturing process. Among usable insulating materials may be, for example, prepreg that is made by semicuring a necessary resin as an insulating layer that has been applied in advance on a reinforcing material such as paper, cloth, glass cloth, heat-resistant synthetic fiber cloth, or the like. Other than covering with a sheet or a tape, applying an insulating material, forming through a resin molding, or other treatments on the metal parts may be applied. The resin molding, which is a process of partially molding a metal part with a resin, may be used if the metal part comprised of the drive body 100 may be positioned without trouble, for example on a member around the projection portion 111 or the inlet F. Therefore, the resin molding needs no sticking step as required for the sheet or the tape, and may form the insulation integrally with the metal part, whereby the manufacturing process can be simplified.

Figure 6:
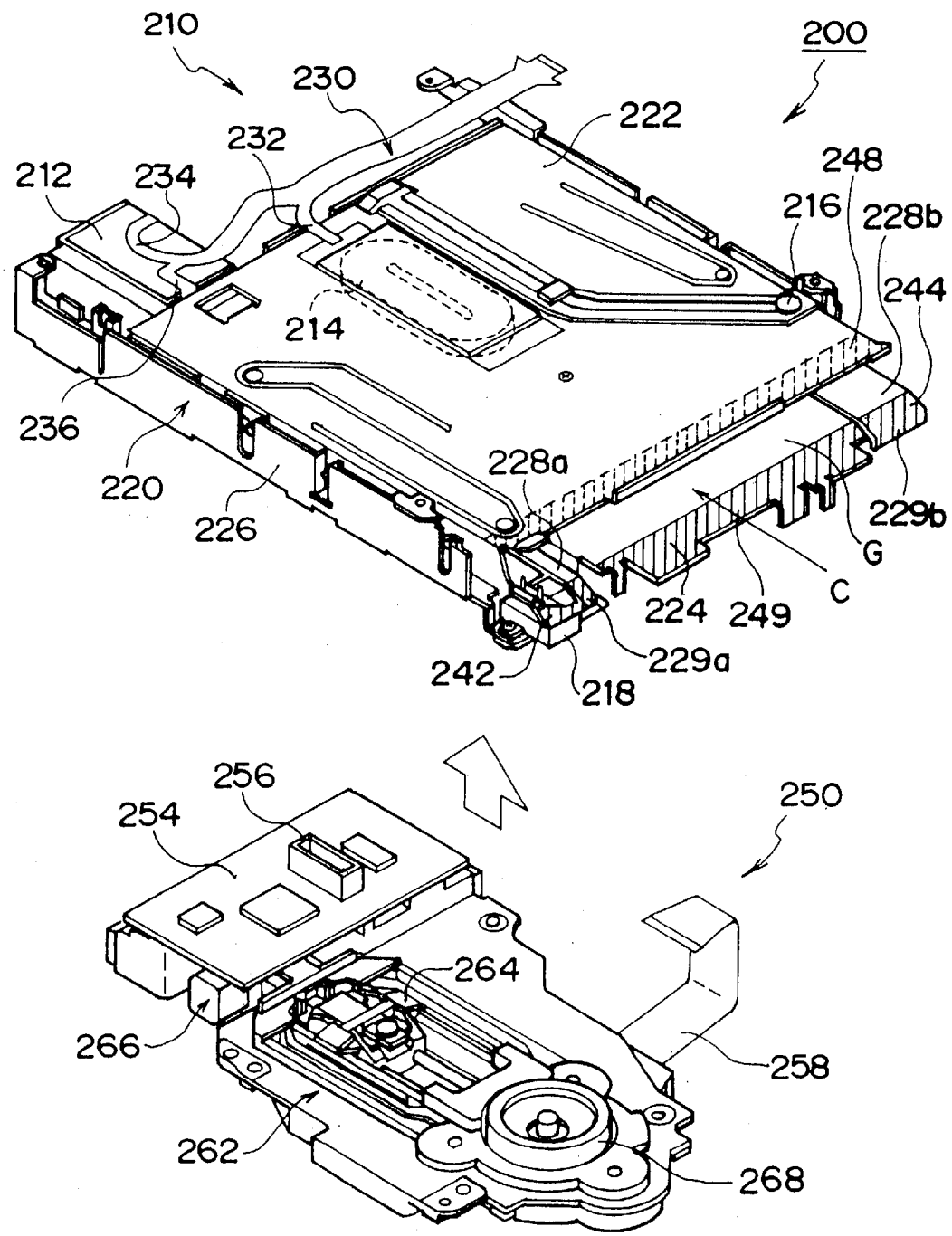
FIG. 6 is a partially exploded perspective view for showing a structure of a drive body as another exemplified embodiment of the present invention.
Figure 7:
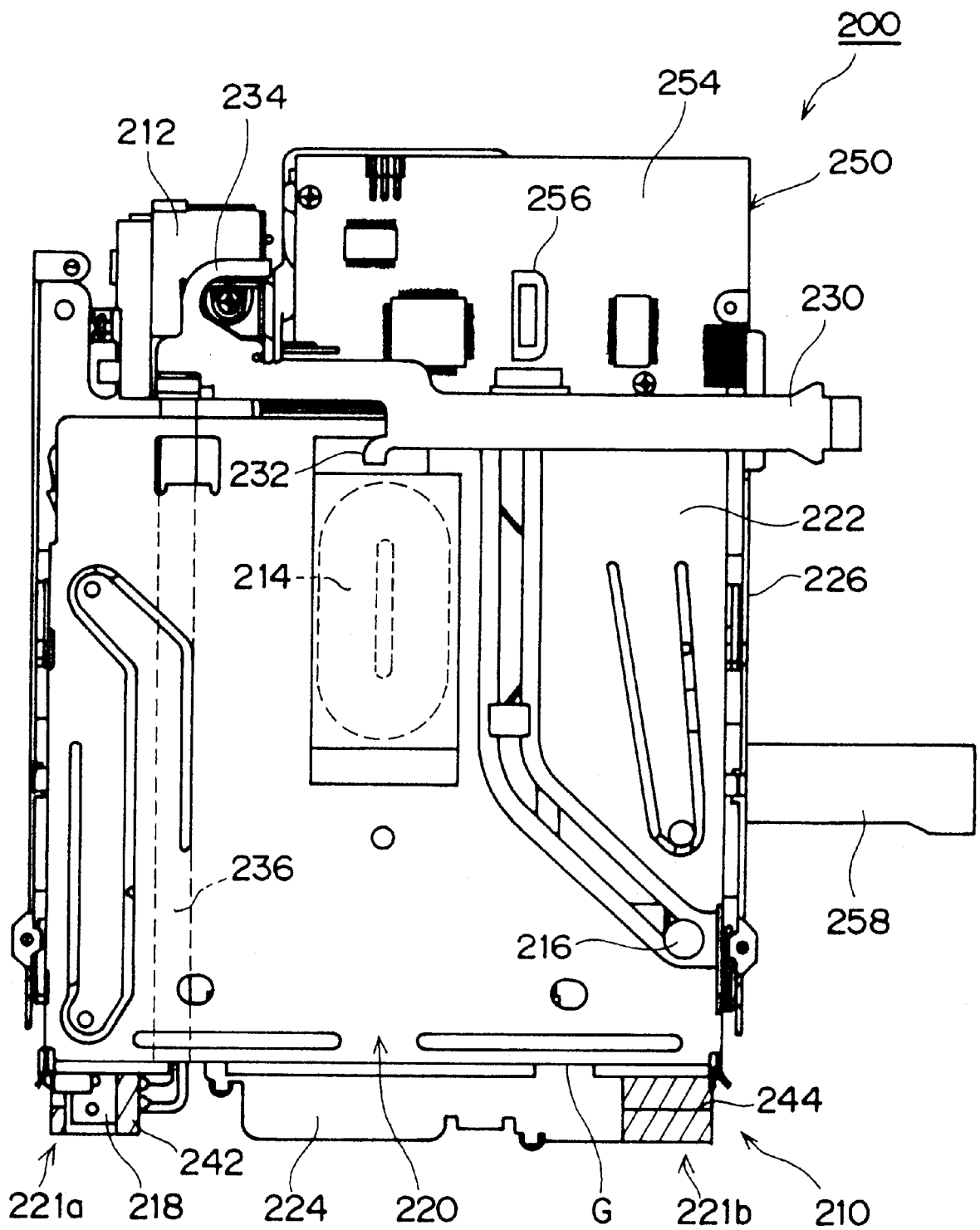
FIG. 7 is a top view of the drive body shown in FIG. 6 that has been assembled
Figure 8:
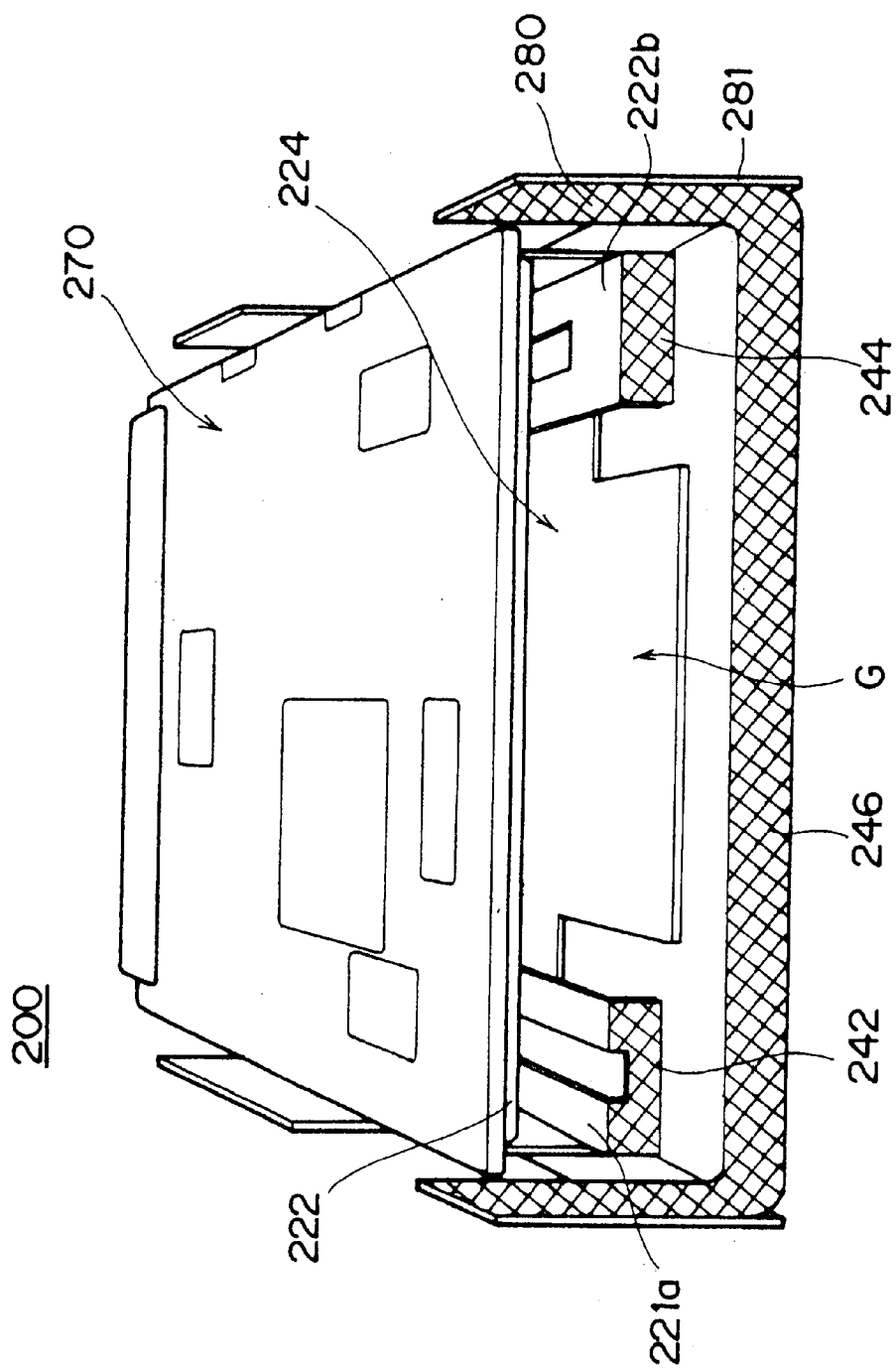
FIG. 8 is a perspective view of the drive body shown in FIG. 6 as viewed from a front side thereof.

Referring next to FIGS. 6 to 8 inclusive, a description will be given of a drive body 200 as another embodiment of the present invention. FIG. 6 is a partially exploded perspective view for showing a structure of the drive body 200 as another embodiment of the present invention. FIG. 7 is a top view of the drive body 200 that has been assembled. FIG. 8 is a front perspective view of the drive body 200, in which components shown in FIGS. 6 and 7 are partly omitted or schematically illustrated for the purpose of explaining mounting of an insulating member 240.

While an ascent/descent plate (not shown) mounted with the disk loading assembly 130 as another body, the fixed optical assembly 116, and the spindle motor 112 is provided on the drive base 110 in the drive body 100, the drive body 200 comprises a load/eject mechanism part 210 equivalent to the disk loading assembly 130, a read/write mechanism part 250 as a combination of the fixed optical assembly 266 and the spindle motor 268. In addition, the drive body 200 further includes a printed wiring board 270 and a frame 280 as shown in FIG. 8. The printed wiring board 270 and the frame 280, which are referred to as the print wiring board 120 and the frame 150 in the aforementioned drive body 100, are different only slightly in shape but similar in functionality and topology; therefore a description will be omitted. The drive body 200, like the drive body 100, includes an insulating sheet and a bottom cover, though not shown in FIGS. 6 through 8. Characteristically, the drive body 200 further includes an insulating member 240.

The load/eject mechanism part 210 is comprised of a rectangular parallelepiped chassis 220 including an inlet G through which a disk cartridge D is inserted from a direction indicated by an arrow C. The chassis 220 includes a top plate 222, a bottom plate 224, and a pair of side plates 226, each made of metal such as metal plate, steel plate, or stainless steel plate. Moreover, the chassis 220 further includes support parts 228 connected with the top plate 222 (i.e., a left support part 228a, and a right support part 228b). The support parts 228 are made by bending a plate constituting the top plate 222 at both sides of the top plate 222 so as to be shaped like the letter U, and support the disk cartridge D. The support parts 228 and the top plate 222 constitute the inlet G. The top plate 222 and the support part 228 can move up and down relative to the bottom plate 224 by an ascent/descent mechanism.

Under the support part 228a is provided a cartridge identification sensor 218 that detects a write-protect indicator on the cartridge, and a type of the cartridge. On a portion opposite to the inlet G is provided an eject motor 212 that ejects an optical disk cartridge D inserted in the chassis 220.

The top plate 222 includes an open/close arm 216 that opens a shutter of the disk cartridge D when the disk cartridge D is inserted into the chassis 220, and a bias magnetic assembly 214. Between the side plate 226 and the top plate 222 is provided an ascent/descent mechanism of the top plate 222, and the top plate 222 and the support part 228 moves down by the ascent/descent mechanism when the disk cartridge D is inserted into the chassis 220. As a result, the disk cartridge D is supported by the bottom plate 224 and engaged with a spindle motor that will be described later. Since any mechanism known in the art is applicable for the ascent/descent mechanism, a description thereof will not be given herein.

The load/eject mechanism part 210 includes an FPC 230 for exchanging a signal with the printed wiring board 270. The FPC 230 has a trifurcated end portion: a first FPC 230 connected with the bias magnetic assembly 214, a second FPC connected with the eject motor 212, and a third FPC 236 connected with the cartridge identification switch 218.

The insulating member 240 includes insulating members 242 and 244 each coating the support parts 228a and 228b respectively, and an insulating member 246 coating the frame 280. The insulating members 242 and 244 are, like the insulating member 10a, made up of an insulating tape, while the insulating member 246 is, like the insulating member 10b, made up of an insulating sheet. The insulating member 240, like the insulating member 10, prevents electrostatic discharge from occurring in the drive body 200, and protects electronic components in the drive body 200 from being destroyed when a disk cartridge D is inserted into the drive body 200, or when a finger or the like comes in the drive body 200. Accordingly, the drive body 200 in the present embodiment is also more impervious to the electronic discharge than a conventional drive body. Further, in order to manufacture the drive body 200 that would bring neither increased manufacturing costs or lowered dimensional accuracy, the present embodiment is configured to have the insulating member 240 formed only on each end portion of the support part 228 and the frame 280 at the side of the drive body 200 from which the disk cartridge D is inserted.

The insulating members 242 and 244 are, as shown by hatching in FIGS. 6 through 8, formed on the end portion of the support part 228 at the side of the drive body 200 from which the disk cartridge D is inserted, and cover an area which extends 1 cm or less in depth along a direction in which the disk cartridge D is inserted from the tapered and projected end surfaces 229a and 229b of the support part 228 (direction C). The width of the area (length in a direction perpendicular to the direction C) may be such a length as covers the entire width of the end surfaces 229a and 229b as in the present embodiment, or may have at least a length enough to cover that inner side of the end surfaces 229a and 229b which a user's finger is allowed to touch (or access). The "1 cm or less" is an exemplary value that means a length enough to prevent the electrostatic discharge, and is not intended to be restrictive. The length may be determined in the same manner as that of the drive base 110. The insulating members 242 and 244 are provided on the end surfaces 229a and 229b for guiding the disk cartridge D to the inlet C, and thus cover the entire width thereof. Alternatively, the end portion of the support parts 228a and 228b may be defined as projection portions 221a and 221b from the top plate 222 as shown in FIG. 8.

The end portion of the frame 280 is positioned at the side of the frame 280 from which the disk cartridge D is inserted as shown by hatching in FIG. 8, and covers an area which extends 1 cm or less in depth along a direction in which the disk cartridge D is inserted from the end surface 281 of the frame 280 (direction C). The width of the area (length in a direction perpendicular to the direction C) may be determined in the same manner as that of the frame 150. The "1 cm or less" is, as described above, an exemplary value that means a length enough to prevent the electrostatic discharge, and is not intended to be restrictive, as described above. In the present embodiment, the insulating member 246, like the insulating member 10b, is shaped like a long sheet having both sides thereof bent when used, so as to be provided on right and left plate-like surfaces of the frame 280.

As shown in FIG. 6, the insulating member 240 may further include an insulating member 248 coating the top plate 222, and an insulating member 249 coating the bottom plate 224. The end portions of the top plate 222 and the plate 224 to be coated with the insulating members 248 and 249 cover an area which extends 1 cm or less in depth along a direction in which the disk cartridge D is inserted from the respective end surfaces 222a and 224a (direction C). The width of the area (length in a direction perpendicular to the direction C) may be determined in the same manner as that of the frame 150, as described above. In addition, the width of the area (length in a direction perpendicular to the direction C) may be such a length as covers the entire width of the top plate 222 or the bottom plate 224 as in the present embodiment, or may have at least a length enough to cover that middle portion of the top plate 222 or the bottom plate 224 which a user's finger is allowed to touch (or access). If the movable panel 346 that will be described later partially covers the end portion of the top plate 222, depending upon the size, or the like of the inlet 344 of the front panel 342, the insulating member 248 may not be needed. Moreover, if the distance between the finger of the user at large, and the bottom plate 224 is so far apart as not to allow electrostatic discharge to occur, the insulating member 249 also may not be needed.

The read/write mechanism part 250 is mounted on a bottom surface of the bottom plate 224 in the load/eject mechanism part 210. The read/write mechanism part 250 includes a metal case 242, a spindle motor 258 a moving optical assembly 262, a fixed optical assembly 266, and a circuit board 254. The circuit board 254 includes a connector 256 connectible with the printed wiring board 270 shown in FIG. 8. The spindle motor 268 and the moving optical assembly 262 are connected with the FPC 258.

Figure 9:
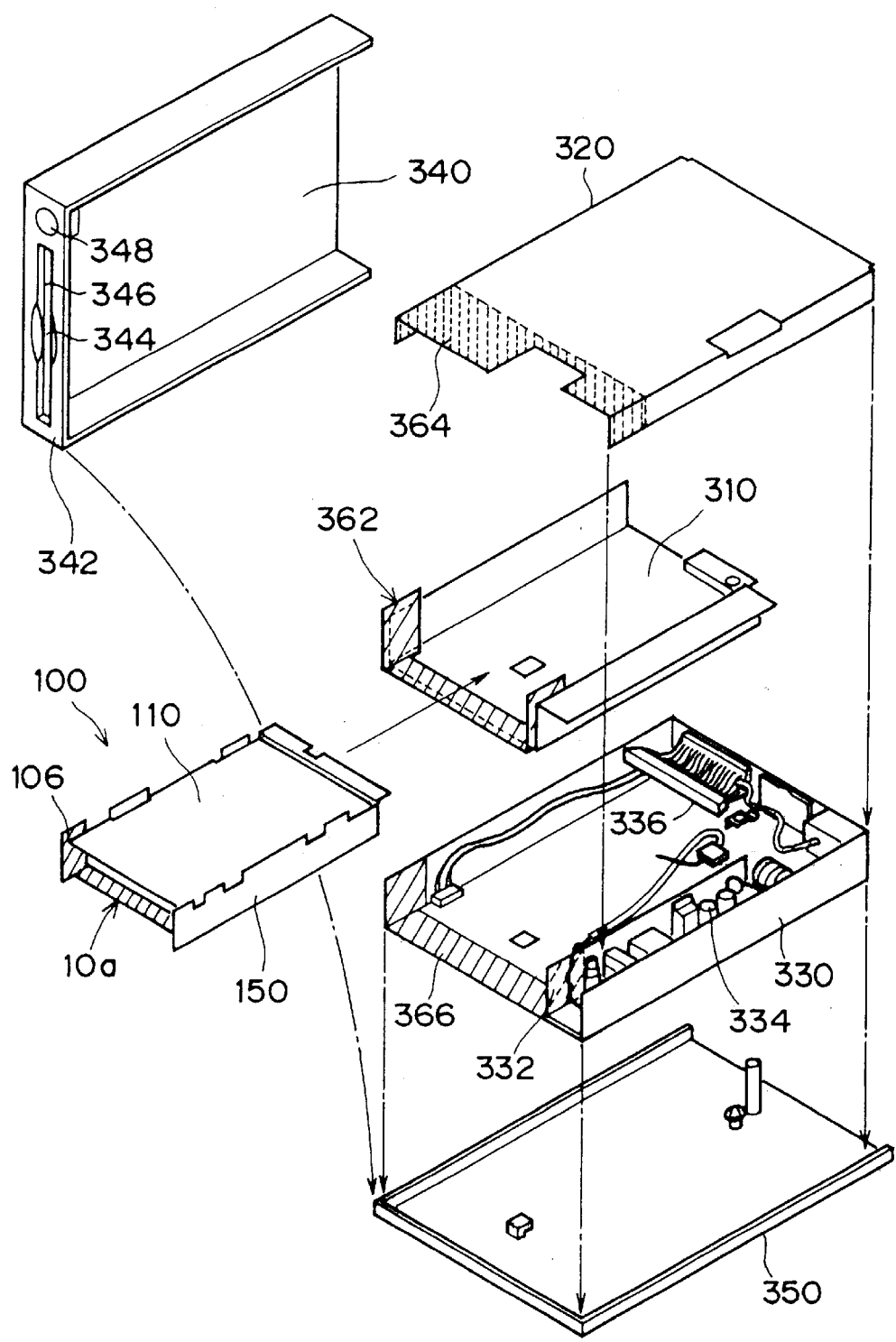
FIG. 9 is an exploded perspective view of a storage device as one exemplified embodiment of the present invention.

Referring now to FIG. 9, a description will be given of the storage device 300 that accommodates the drive body 100 as an external removable memory drive. FIG. 9 is an exploded perspective view of the storage device 300 as one embodiment of the present invention.

As shown in FIG. 9, the storage device 300 comprises a drive body 100, a mounting frame 310, a cover 320, a storage part 330, a top case 340, a bottom case 350, and an insulating member 360 (i.e., insulating members 362 through 366).

The drive body 100 is stored in the storage part 330 via the mounting frame 310. The storage part 330 is covered with the cover 320, and stored in an external housing made of plastic comprised of the top case 340 and the bottom case 350. The mounting frame 310 is formed by bending a metal plate such as aluminum, stainless steel, and iron so as to assume the shape of a letter U. The mounting frame 310 may serve to prevent an impact outside and a noise from transmitting to the drive body 100.

The cover 320 is a shield cover that prevents the impact outside from transmitting to the drive body 100. The storage part 330 includes a separator 332, a power supply unit 334, and a SCSI interface 336. In the storage part 330, the drive body 100 fitted in the mounting frame 310 is fixed via the separator 332. The separator 332 serves to separate a first circuit and a second circuit of the power supply unit 334 as well as to shielding electricity, magnetic fields, heat, and impacts. The power supply unit 334 includes a plug through which power is fed from a host computer or the like to supply a driving power to the drive body 100. The drive body 100 is connected with the host computer via the SCSI interface 336.

The insulating member 360 includes an insulating member 362 coating the mounting frame 310, an insulating member 364 coating the storage part 330 and an insulating member 366 coating the cover 320. The insulating member 362 serves to prevent electrostatic discharge so as not to allow the electrostatic discharge produced between a finger or the like and the metal mounting frame 310 to induce an electric current to the metal storage part 330. Similarly, the insulating members 364 and 366 serves to prevent electrostatic discharge so as not to allow the electrostatic discharge produced between a finger or the like and the metal cover 320 or storage part 330 to induce an electric current to an electronic circuit that may be stored in the drive body 100 and the storage part 330. The insulating member 360 coats end portions of the elements 310 through 330, but since the definition of the end portion is the same as mentioned above, a description thereof will be omitted.

The insulating members 362 through 366 in the present embodiment are, as shown in FIG. 9, shaped like a sheet bent along the shape of an end portion of each metal component on which the insulating members are provided when used; that is, the insulating members 362 through 366 are bent so as to assume nearly the shape of a letter U, and brought into intimate contact with each element 310 through 330.

The elements 310 through 330 are made of metal, and thus, electrostatic discharge, even if prevented from occurring directly in the drive body 100, occurs between the elements 310 through 330, so that an electric current derived from the discharge may be transferred through these elements to the drive body 100. Although the SCSI interface is used in the drive body 100 according to the present embodiment, if a USB or IEEE1394 interface is used, the storage part 330 includes a printed circuit board for an interface in a portion corresponding to the element 336. In that event, the storage device has an increased number of electronic components likely to be destroyed by electrostatic discharge other than the drive body 100. Therefore, the insulating member 360 is expected to serve to totally protect the drive body 100 and the electronic components mounted in the storage part 330.

The top case 340 and the bottom case 350 constitute an insulating external housing made of plastic, or the like. The top case 340 includes a front panel 342 having an inlet 344 for the disk cartridge D. The inlet 344 is fitted and coupled with the inlet F of the drive body 100. The inlet 344 is provided with a movable panel 346 capable of opening and closing. The front panel 342 further includes an eject button 348 for the disk cartridge D. The disk cartridge D is automatically ejected from the storage device 300 by pressing the button. However, provision of the eject button 348 is optional. The top case 340 and the bottom case 350 enclose metal components inside, and form a housing made of plastic.

Figure 14:
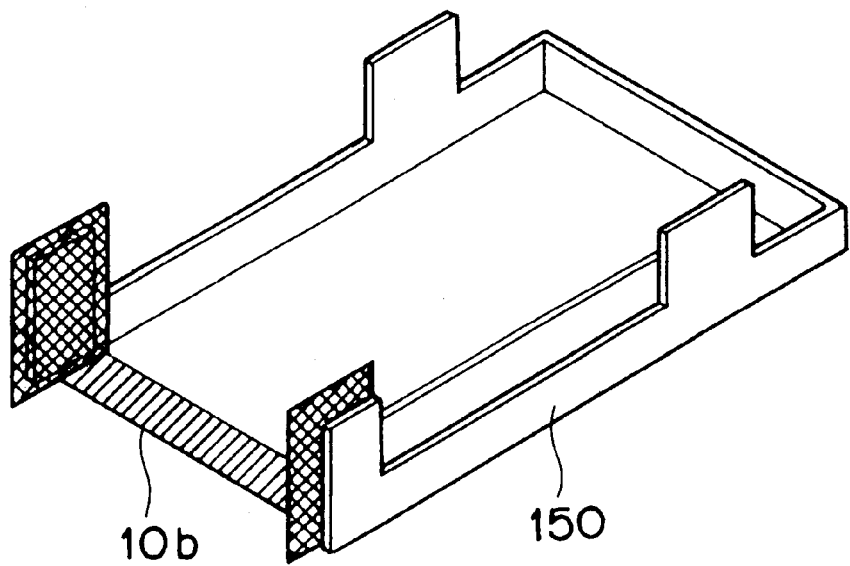
FIG. 14 is a schematic perspective view of the frame.
Figure 15:
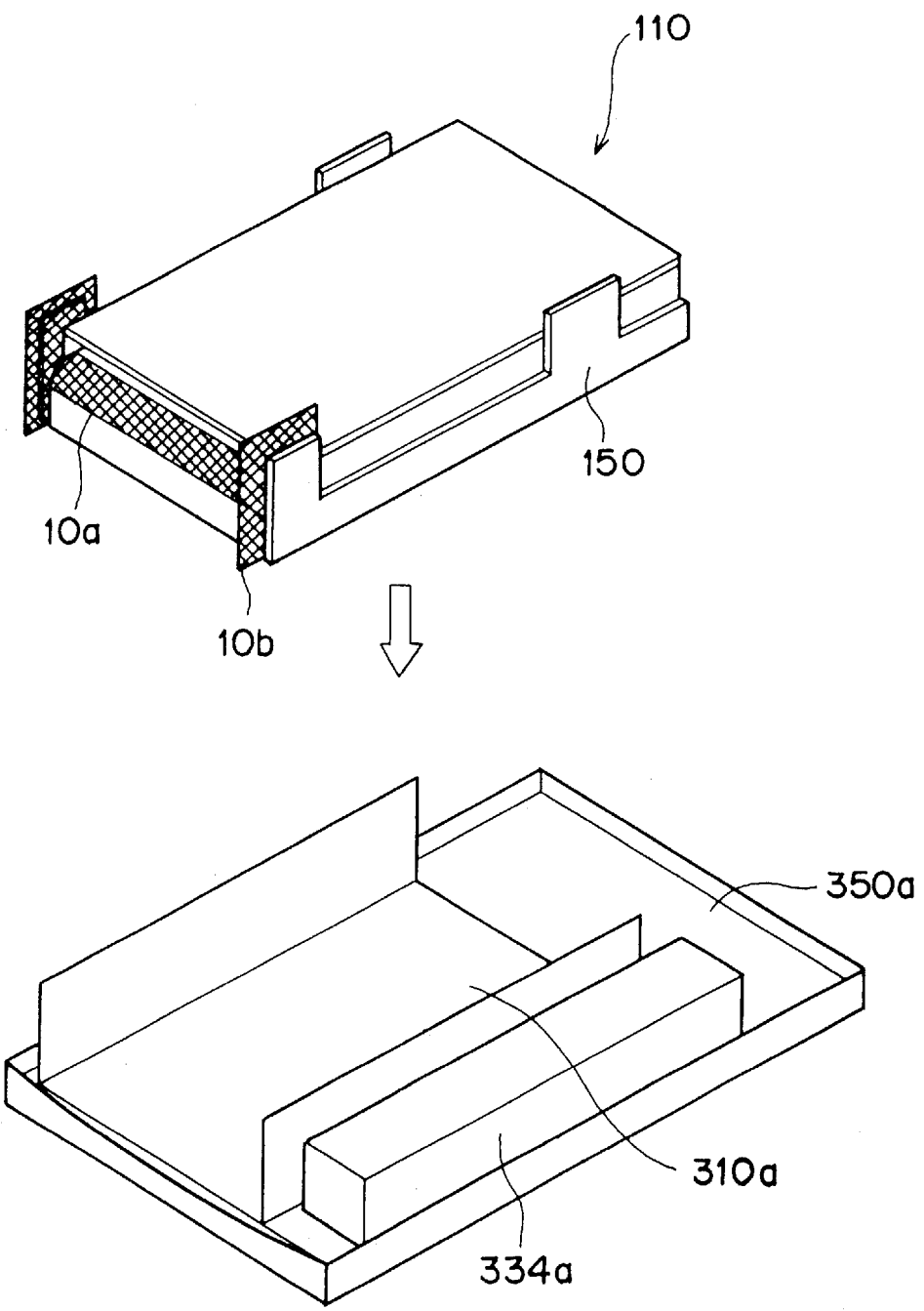
FIG. 15 is a partially exploded perspective view of the storage device shown in FIG. 12.

Depending upon the types of the storage devices 300, all or any of the elements 310 through 330 may be omitted, and additional members may be provided. For instance, as shown in FIGS. 12 through 15, there exists a storage device 300a in which elements equivalent to the cover 320 and the storage part 330 are removed. The storage device 300a is mounted via a mounting frame 310a after the frame 150 shown in FIG. 14 is mounted on the drive body 100 (excluding the frame 150) shown in FIG. 13 in such a manner as in FIG. 15 on the upper side. A bottom case 350a is mounted with a top case 340a to form the storage device 300a shown in FIG. 12. The bottom case 350a is mounted with a power supply unit 334a. The interfaces and other circuitry are omitted in FIGS. 12 through 15 for the sake of convenience.

Figure 10:
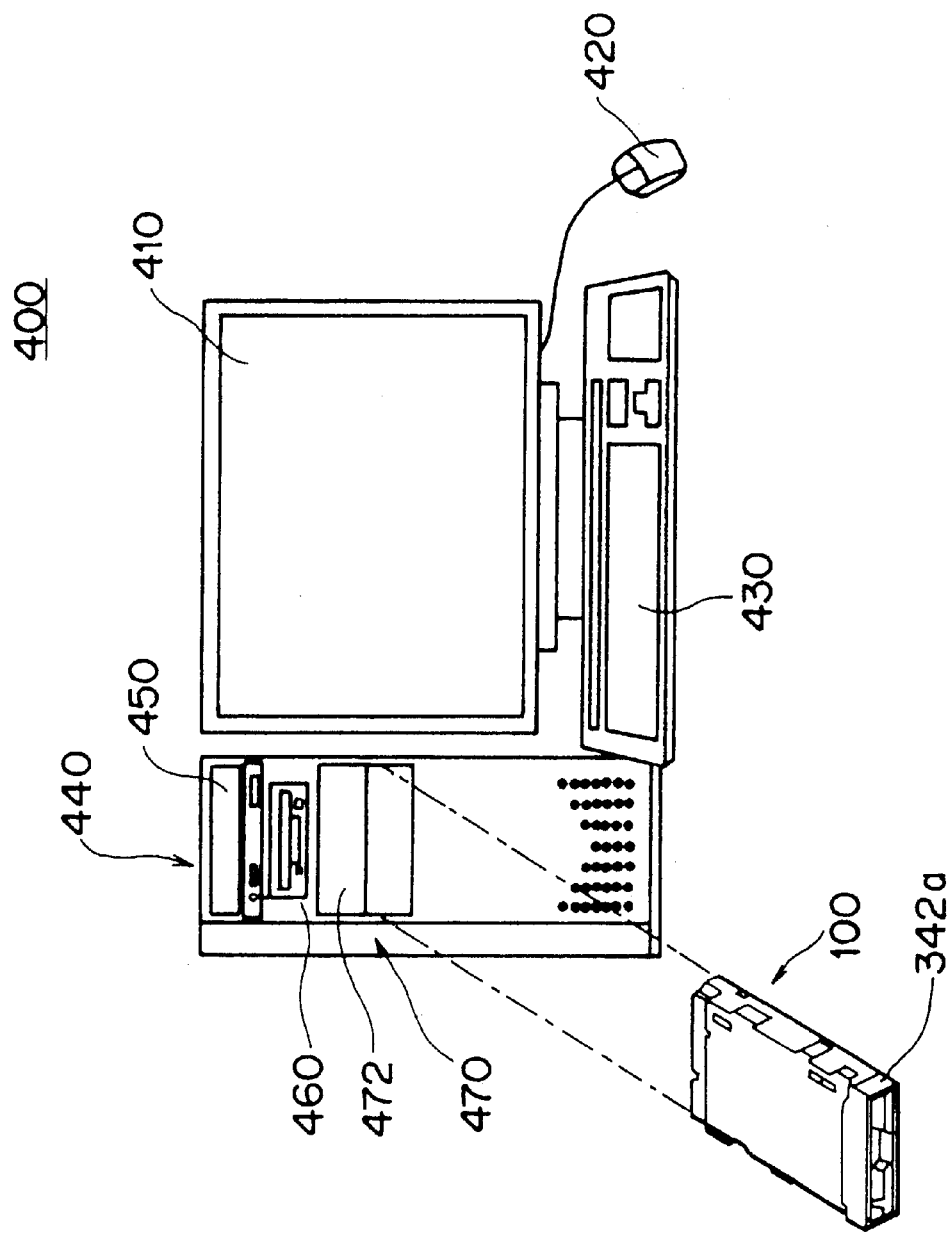
FIG. 10 is a perspective overview of a storage device as another exemplified embodiment of the present invention.

Next, a description will be given of a storage device 400 to which the inventive drive bodies 100 and 200 are applicable with reference to FIG. 10. FIG. 10 is a schematic perspective view of the storage device 400 configured as a tower type PC. In the present embodiment, a description will be given of the storage device 400 applicable to the drive body 100 for expediency's sake in explaining. The storage device 400 includes a display 410, a mouse 420, a keyboard 430, and a PC unit 440. Any devices known in the art may be applied to the display 410, the mouse 420, the keyboard 430, and thus a detailed description thereof will be omitted herein.

The PC unit 440 is comprised of an insulating housing made of plastic, or the like, and internally provided with main electronic components (a mother board, a CPU, a memory, and other peripheral buses, or the like) making up the computer. The PC unit 440 includes a CD-ROM drive 450, an FD drive 460, and an add-on mounting part 470. The inventive drive body 100 may be (for example, optionally) mounted in the add-on mounting part 470 that is a portion in which an add-on unit is installed. Further, characteristically, the drive body 100 is mounted with a front panel 342a, and stored in the PC unit 440. If the add-on mounting part 470 is installed with the drive body 100, the panel 472 is removed and the drive body 100 is fitted inside.

Figure 11:
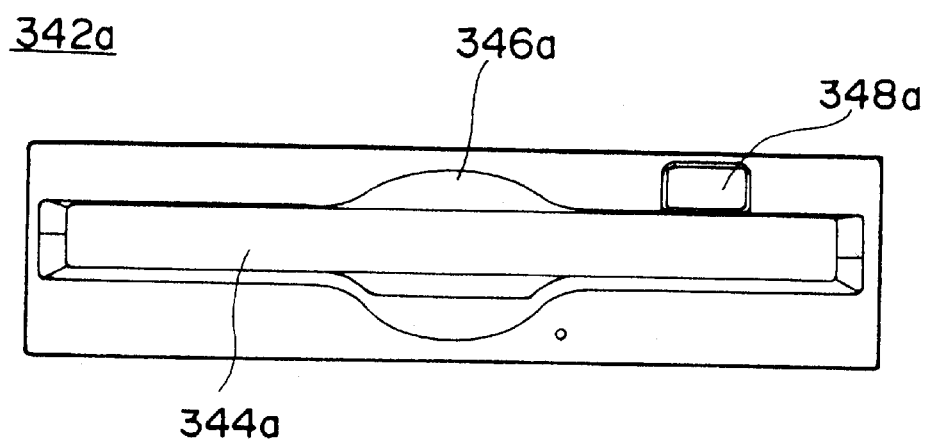
FIG. 11 is a front view of a front panel that may be attached to the drive body shown in FIG. 1.
Figure 12:
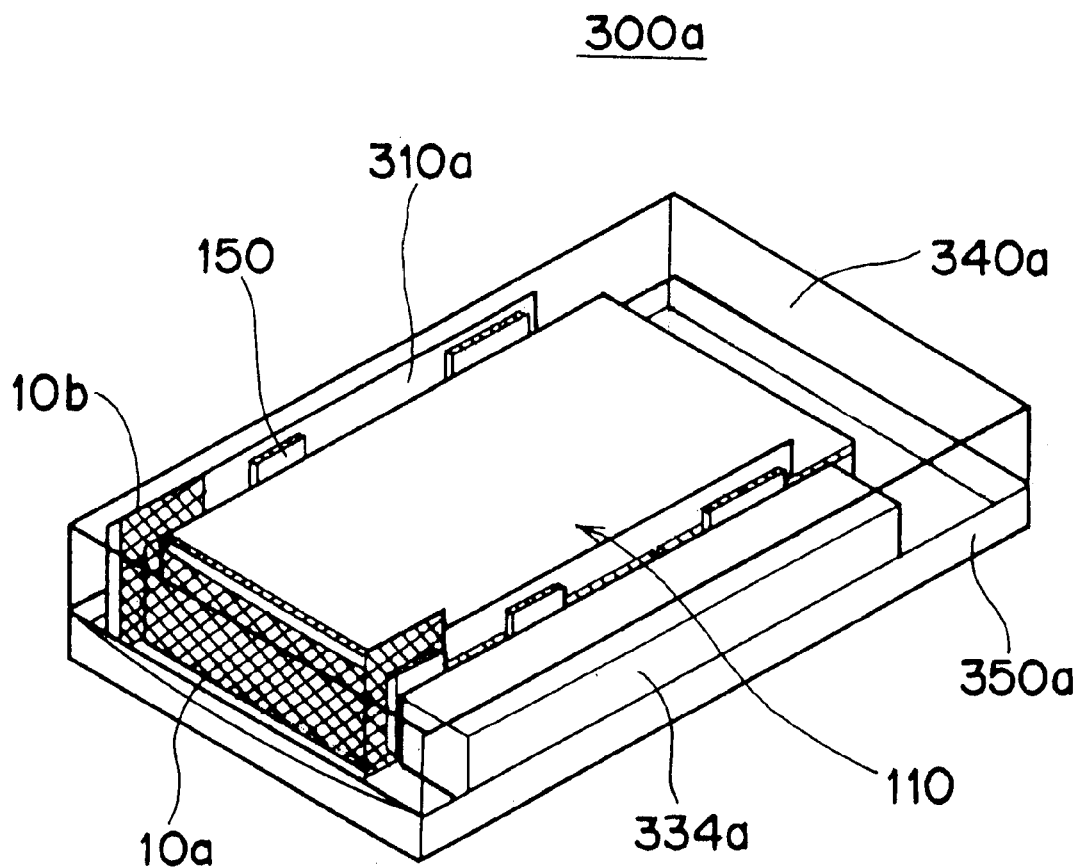
FIG. 12 is a schematic perspective view of a storage device as another exemplified embodiment of the present invention.
Figure 13:
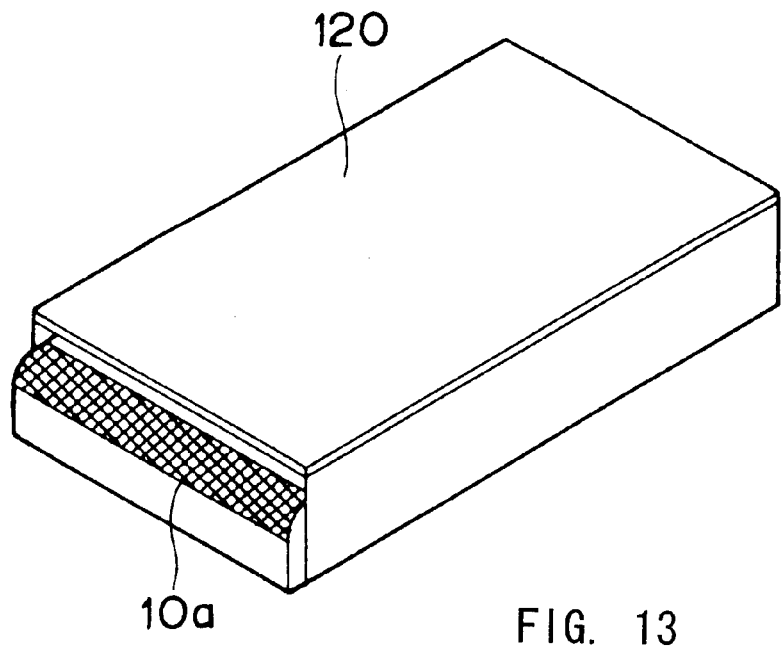
FIG. 13 is a schematic perspective view of the drive body in which a frame is eliminated for illustration purposes.

The front panel 342a, as shown in FIG. 11, includes an inlet 344a for disk drive D, a movable panel 346a that may pivot so as to open and close, and a button 348a that ejects the disk drive D. FIG. 11 is a front view of the front panel 342a. The front panel 342a is made of an insulating material such as plastic or the like, but metal parts inside the drive body 100 are exposed when the inlet 344 opens, and thus the drive body 100 is subjected to insulating treatment as shown in FIG. 2. In general, the range of the insulating treatment in the drive body 100 as viewed from a user of the storage device 400, may be the range within which the user can make visual observations when the inlet 344a of the front panel 342a is opened.

In the present embodiment, conductive members disposed around the storage medium, though having described with reference to a variety of metal members, are not limited to these metal members, and for example, conductive plastic or other members, if having high hardness and positioning accuracy, may be used for the loading assembly 130. Accordingly, the usable conductive members may include conductive plastic, conductive ceramic, or the like, and is not limited to metal.

As has been described above, the inventive electronic apparatus is provided with an insulating member, which was not conventionally provided, on a conductive member, and therefore more impervious to electronic discharge. As a result, electrostatic discharge is prevented from occurring in a conductive portion of electronic components and destroying the electronic components when a storage medium is inserted into the electronic apparatus, or when a finger or the like comes in the electronic apparatus. Further, the inventive electronic apparatus may prevent an external device connected therewith from being affected by electrostatic discharge.

The inventive electronic apparatus is provided with an insulating member, which was not previously provided, on a storage part that accommodating a drive body, and thus more impervious to electronic discharge. The inventive electronic apparatus may prevent electronic discharge from occurring between a finger or the like and storage part or conductive components, and electric current induced by the discharge from being propagated to a drive body or electronic circuit that would possibly be stored in the storage part.

Further, the inventive mounting member is provided with an insulating member on a support part that supports the drive body, and thus more impervious to electronic discharge. Therefore, the inventive mounting member may prevent electronic discharge from occurring between a finger or the like and a conductive mounting frame, and electric current by the discharge from being propagated to the drive body or the storage part.

The insulating member provided on the electronic apparatus is formed only on an end portion of each conductive member, and thus may provide a manufacturing method of the electronic apparatus that does not result in increased manufacturing costs or lowered dimensional accuracy. Furthermore, the insulating member is made up of materials selected among an insulating sheet, an insulating tape, an insulating resin application coating, and an insulating resin molding, and thus may assume a variety of shapes without restriction, save space, so that electronic apparatus having any shapes may be provided with the insulating member.

What is claimed is:

1. An electronic apparatus including an opening through which a storage medium is inserted into and ejected from, comprising:
    a conductive member disposed adjacent to said opening; and
    an insulating member provided at least near said opening on a surface of said conductive member facing said storage medium, wherein said insulating member is coated or laminated to said surface of said conductive member facing said storage medium.

2. An electronic apparatus according to claim 1, wherein said conductive member is selected from at least one of a holder that supports said storage medium in position, a holding member that holds said holder, and a frame that encloses said holder and said holding member.

3. An electronic apparatus according to claim 1, wherein said conductive member includes a projection portion that projects toward said opening, and said projection portion is provided with the insulating member.

4. An electronic apparatus according to claim 1, wherein said insulating member covers an area on said conductive member which extends 1 cm or less from an end portion of said conductive member near said opening along a direction in which said storage medium is inserted.

5. An electronic apparatus according to claim 1, wherein said insulating member is selected from at least one of an insulating sheet, an insulating tape, an insulating resin film, and an insulating resin molding.

6. An electronic apparatus comprising:
    a storage part that stores and holds a drive body including an opening through which a storage medium is inserted into and ejected from said drive body; and
    an insulating member provided at least on an end portion of said storage part near said opening, wherein said insulating member is coated or laminated to said end portion of said storage part near said opening.

7. An electronic apparatus according to claim 6, further comprising a cover that covers said storage part, wherein the insulating member is provided at least on an end portion of said cover near said opening.

8. An electronic apparatus according to claim 6, wherein said insulating member is selected from at least one of an insulating sheet, an insulating tape, an insulating resin film, and an insulating resin molding that has been molded upon at least a portion of said end portion of said storage part.

9. An electronic apparatus comprising:
    a storage part that stores and holds a drive body including an opening through which a storage medium is inserted into and ejected from said drive body; and
    an insulating member provided at least on an end portion of said storage part near said opening,
    further including a power supply unit that feeds power to said drive body, and a separator that separates a primary circuit and a secondary circuit from each other in said power supply unit, wherein said separator is provided with the insulating member.

10. A mounting member comprising:
    a support part that supports a drive body including an opening through which a storage medium is inserted into and ejected from said drive body, so as to mount said drive body in a housing capable of accommodating said drive body; and
    an insulating member provided at least on a portion of said support part near said opening, wherein said insulating member is coated or laminated to said end portion of said storage part near said opening.

11. A mounting member according to claim 10, wherein said insulating member is selected from at least one of an insulating sheet, an insulating tape, an insulating resin film, and an insulating resin molding.

12. An electronic apparatus including an opening through which a storage medium is inserted into and ejected from, comprising:
    a conductive member disposed around said adjacent to said opening inserted; and
    an insulating member provided at least near said opening on a surface of said conductive member facing said storage medium,
    wherein said insulating member is a coating or lamination that coats said surface of said conductive member facing said storage medium.

13. An electronic apparatus according to claim 12, wherein said insulating member is selected from at least one of an insulating sheet, an insulating tape, an insulating resin film, and an insulating resin molding that has been molded upon at least a portion of said conductive medium.

14. An electronic apparatus according to claim 12, wherein said insulating member coats said surface of said conductive member facing said storage medium without coating an opposite surface said conductive member that faces away from said storage medium.

15. An electronic apparatus according to claim 12, wherein said insulating member wraps around an edge of said conductive member, such that said insulating member also coats an opposite surface said conductive member that faces away from said storage medium.

16. An electronic apparatus comprising:
    a storage part that stores and holds a drive body including an opening through which a storage medium is inserted into and ejected from said drive body; and an insulating member provided at least on an end portion of said'storage part near said opening, wherein said insulating member is a coating that coats said end portion of said storage part near said opening, wherein said insulating member is a coating or lamination that coats said end portion of said storage part near said opening.

17. An electronic apparatus according to claim 16, wherein said insulating member coats surfaces of said end portion of said storage part facing said storage medium without coating surfaces of said end portions of said storage part that face away from storage medium.

18. A mounting member comprising:

a support part that supports a drive body including an opening through which a storage medium is inserted into and ejected from said drive body, so as to mount said drive body in a housing capable of accommodating said drive body; and an insulating member provided at least on a portion of said support part near said opening, wherein said insulating member is a coating or lamination that coats said portion of said support part near said opening.

19. A mounting member according to claim 18, wherein said insulating member coats a surface of said support part that faces said storage medium without coating an opposite surface said support part that faces away from said storage medium.

20. A mounting member according to claim 18, wherein said insulating member wraps around an edge of said storage part, such that said insulating member also coats an opposite surface said support part that faces away from said storage medium.

* * * * *

UNITED STATES PATENT AND TRADEMARK OFFICE
CERTIFICATE OF CORRECTION

PATENT NO.    : 6,560,097 B2
DATED         : May 6, 2003
INVENTOR(S)   : Naruo et al.

It is certified that error appears in the above-identified patent and that said Letters Patent is hereby corrected as shown below:

Column 14,
Lines 41-42, replace "a conductive member disposed around said adjacent to said opening inserted; and" with -- a conductive member disposed adjacent to said opening; and --.

Column 15,
Line 2, replace "of said'storage part near" with -- of said storage part near --.

Signed and Sealed this

Twenty-third Day of December, 2003

JAMES E. ROGAN
*Director of the United States Patent and Trademark Office*